US009047571B2

United States Patent
Miller et al.

(10) Patent No.: US 9,047,571 B2
(45) Date of Patent: Jun. 2, 2015

(54) METHOD AND APPARATUS FOR QUANTUM HOLOGRAPHIC INFORMATION PROCESSING

(75) Inventors: Warner A. Miller, Boca Raton, FL (US); Grigoriy Kreymerman, Pembroke Pines, FL (US); Paul M. Alsing, Chittenango, NY (US)

(73) Assignee: FLORIDA ATLANTIC UNIVERSITY, Boca Raton, FL (US)

( * ) Notice: Subject to any disclaimer, the term of this patent is extended or adjusted under 35 U.S.C. 154(b) by 534 days.

(21) Appl. No.: 13/451,638

(22) Filed: Apr. 20, 2012

(65) Prior Publication Data

US 2014/0192388 A1      Jul. 10, 2014

Related U.S. Application Data

(60) Provisional application No. 61/477,856, filed on Apr. 21, 2011.

(51) Int. Cl.
| | |
|---|---|
| *G03H 1/02* | (2006.01) |
| *G06N 99/00* | (2010.01) |
| *G03H 1/00* | (2006.01) |
| *G03H 1/26* | (2006.01) |
| *B82Y 10/00* | (2011.01) |

(52) U.S. Cl.
CPC ........... *G06N 99/002* (2013.01); *G03H 1/0005* (2013.01); *G03H 1/265* (2013.01); *B82Y 10/00* (2013.01); *G03H 1/0248* (2013.01)

(58) Field of Classification Search
CPC ............ G02F 3/00; G02F 1/01; G01S 13/00; G06E 3/002; G06E 1/13; G06F 7/00; G06F 17/14; G06F 15/18; H04L 9/28; H04B 10/00; H04B 10/12; G06N 1/00; G06N 99/00; G06N 99/002; G05B 15/00; G03H 1/12; G03H 1/26; G03H 1/0005; G03H 1/265; G02B 27/00

See application file for complete search history.

(56) References Cited

U.S. PATENT DOCUMENTS 5,285,308 A * 2/1994 Jenkins et al. ................. 359/260
5,940,193 A * 8/1999 Hotaling et al. ................. 359/11

OTHER PUBLICATIONS

Reck et al, Experimental Realization of Any Discrete Unitary Operator, Phys. Rev. Lett., vol. 73(1), pp. 58-62, Jul. 1994.*

(Continued)

*Primary Examiner* — Stephone B Allen
*Assistant Examiner* — Jyotsna Dabbi
(74) *Attorney, Agent, or Firm* — Eduardo J. Quinones; Novak Druce Conolly Bove + Quigg LLP

(57) ABSTRACT

Encoding of quantum algorithm and devices therefrom are provided. The encoding includes receiving a unitary matrix operator representing the quantum algorithm, each row of the unitary matrix operator defining a superposition of basis state vectors for transforming input states to output states. The encoding also includes recording rows of the unitary matrix operator by applying, to a volume holographic element, a combination of an $i^{th}$ one of n reference waves and a superposition of n signal waves defined by the superposition defined in an $i^{th}$ row of the unitary matrix operator. The n signal waves are a first set of n plane waves lying on a first conical surface having a first half angle and the n reference waves are a second set of n plane waves lying on a second conical surface, concentric with the first conical surface, with a second half angle different that the first half angle.

20 Claims, 10 Drawing Sheets

(56) References Cited

OTHER PUBLICATIONS

Lee et al, Binary Synthetic Holograms, Applied Optics, vol. 13(7), pp. 1677-1682, Jul. 1974.*

Gottesman et al, Demonstrating the viability of universal qunatum computation using teleportation and single qubit operations, Nature, vol. 402, pp. 390-392, Nov. 25, 1999.*

Sokolov et al, Quantum holographic teleportation, Optics Commun, vol. 193, pp. 175-180, Jun. 15, 2001.*

Tseng et al, Implementation of discrete unitary transformations by multimode waveguide holograms, Applied Optics, vol. 45(20), pp. 4864-4872, Jul. 10, 2006.*

Knill et al, A scheme for efficient qunatum computation with linear optics, Nature, vol. 409, pp. 46-52, Jan. 4, 2001.*

Gasparoni et al., Phys. Rev. Let., 93(2) 020504-1 (2004), "Realization of a Photonic Controlled-NOT Gate Sufficient for Quantum Computation".

Pittman et al., Phys. Rev. Let., 68(3) 032316-1 (2003), "Experimental Controlled-NOT Logic Gate for Single Photons in the Coincidence Basis".

Knapp, Forbes, Mar. 3, 2012 http://www.forbes.com/sites/alexknapp/2011/12/21/the-air-force-is-working-on-a-holographic-quantum-computer/ "The Air Force is Working on a Holographic Quantum Computer".

* cited by examiner

METHOD AND APPARATUS FOR QUANTUM HOLOGRAPHIC INFORMATION PROCESSING

CROSS-REFERENCE TO RELATED APPLICATIONS

This application claims priority to U.S. Provisional Patent Application No. 61/477,856, entitled "METHOD AND APPARATUS FOR QUANTUM HOLOGRAPHIC INFORMATION PROCESSING", filed Apr. 21, 2011, the contents of which are hereby incorporated by reference in their entirety.

STATEMENT REGARDING FEDERALLY SPONSORED RESEARCH

This invention was made with government support under grant no. FA8750-10-2-0017 awarded by the U.S. Air Force Research Laboratory. The government has certain rights in the invention.

FIELD OF THE INVENTION

The present invention relates to quantum computing, and more specifically to apparatus and methods for holographic information processing during quantum computing.

BACKGROUND

Various approaches have been proposed for quantum computing. Perhaps the most familiar of these is the quantum circuit model (QCM). The challenge in QCM is to identify a suitable subset of a universal set of quantum gates that can faithfully represent a family of unitary operations on d qubits (d-partite), such that the number of gates required scale polynomially in d, whilst the dimension grows exponentially as $2^d$. After the unitary evolution, the output needs to be projected onto the computational basis and irreversibly measured. One realization of the QCM has been linear optical quantum computing (LOQC) and one-way quantum computing (OWQC), which are also known as cluster-state quantum computing. The essential feature of each of these approaches involves either a non-linear measuring process, a preparation of hyper-entangled input states (|IN⟩), or both. Here a sequence of measurements are made to project the output state (|OUT⟩) onto one or another of the computational basis states, i.e. onto a mutually unbiased basis (MUB).

In practice, it has been suggested that photons offer great promise for producing gates according to the QCM model for quantum information processing (QIP) given their robustness to decoherence. However, it is this very resiliency that hinders their utility in quantum computing. In particular, their weak coupling with atomic structures leads to substantial inefficiencies. Further, practical implementations of photonic gates are typically complex and their stability is often at issue.

SUMMARY

Embodiments of the invention concern quantum holographic information processing and devices therefrom. In a first embodiment of the invention, a method of encoding a quantum algorithm in an optical device is provided. The method includes receiving an n by n unitary matrix operator representing the quantum algorithm, each row of the unitary matrix operator defining a superposition of n basis state vectors for transforming an input state into an output state. The method also includes recording each row of the unitary matrix operator by applying, to a volume holographic element having first and second opposing and substantially parallel faces, a combination of an $i^{th}$ one of n reference waves and a superposition of n signal waves corresponding to the superposition defined in an $i^{th}$ row of the unitary matrix operator. In the method, the n signal waves comprise a first set of n plane waves lying on a first conical surface having a first half angle and extending along an axis from a selected point on a first face of the volume holographic element, the n reference waves include a second set of n plane waves lying on a second conical surface with a second half angle and extending along the axis and from the selected point, and the second half angle and the first half angle are different.

In a second embodiment of the invention, a system for encoding a quantum algorithm in an optical device is provided. The system includes a controller for receiving an n by n unitary matrix operator representing the quantum algorithm, each row of the unitary matrix operator defining a superposition of n basis state vectors for transforming an input state into an output state. The system also includes a recording stage operatively coupled to the controller for recording each row of the unitary matrix operator. In operation, the controller causes the recording stage to selectively apply, to a volume holographic element having first and second opposing and substantially parallel faces, a combination of an $i^{th}$ one of n reference waves and a superposition of n signal waves corresponding to the superposition defined in an $i^{th}$ row of the unitary matrix operator. The recording stage comprises a first set of optical components for generating the superposition of the n signal waves by directing a combination of plane waves selected from a first set of n plane waves lying on a first conical surface having a first half angle and that extend along an axis from a selected point on a first face of the volume holographic element. Further, the recording stage comprises a second set of optical components for generating the $i^{th}$ one of the n reference waves by directing a plane wave selected from a second set of n plane waves lying on a second conical surface with a second half angle different than the first half angle and extending along the axis and from the selected point.

In a third embodiment of the invention, a system for quantum information processing using an optical device is provided. The system includes at least one volume holographic element having first and second opposing and substantially parallel faces and that, responsive to receiving at least one of n pre-defined superpositions of n pre-defined signal plane waves lying on a first conical surface having a first half angle, produces an output including at least one of n pre-defined reference plane waves lying on a second conical surface with a second half angle different than the first half angle, wherein each of the n pre-defined reference plane waves uniquely corresponds to each of the n pre-defined superpositions. The system also includes an input stage optically coupled to the first face of the at least one volume holographic element and for generating at least one incident plane wave comprising at least one of the n-pre-defined superpositions. The system further includes a detector stage optically coupled to the second face of the at least one volume holographic element and for detecting an output intensity for the n pre-define reference waves responsive to the at least one incident plane wave.

DETAILED DESCRIPTION

Figure 1:
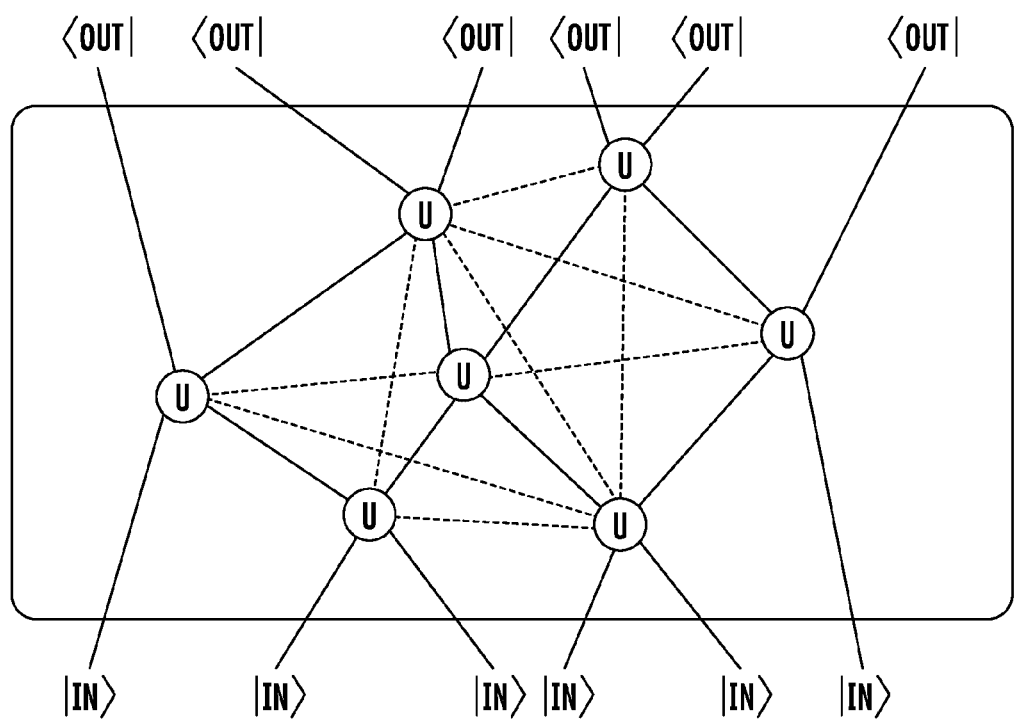
FIG. 1 is a schematic diagram of a holographic element in accordance with the various embodiments.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The various embodiments of the invention are directed to the design, fabrication and use of volume holographic elements for QIP. Specifically, the various embodiments provide multiplexed holographic elements for providing quantum gates and simple quantum algorithms by taking advantage of the fact that such gates and algorithms constructed based on the quantum circuit model can be efficiently simulated by the diffraction phenomena of a photon within such holographic elements. In particular, the various embodiments rely on quantum eigenstates associated with the photon's linear momentum (LM) as measured by the number of waves of tilt across the aperture. Thus, the various embodiments provide methods for encoding such matrices into a holographic medium and devices therefrom.

The core principle of the various embodiments is that any quantum algorithm can be encoded within a single, compact holographic element. For example, FIG. 1 is a schematic diagram of a holographic element 100 in accordance with the various embodiments. In particular, for a series of computations of $|OUT\rangle = \hat{u}_{QC}|IN\rangle$ for multiple entangled states, a unitary matrix operator can be defined such that for any set of input states, the corresponding output states can be simultaneously computed.

With respect to the holographic medium, thickness can be critical. The present inventors have found that a 1 mm/N thickness of holographic material is sufficient for most quantum algorithms, where (N) is the dimension of the state space. This thickness ensures high fidelity unitary transformations. Nevertheless, there are commercially available holographic media, e.g. OptiGrate's photo-thermal refractive (PTR) glass, that can support faithful holograms with a thickness approaching a few centimeters, thereby extending considerations to 10 to 20 dimensional quantum state spaces.

Two properties of quantum computing within the quantum circuit model make the approach of the various embodiments attractive. First, any conditional measurement can be commuted in time with any unitary quantum gate—the timeless nature of quantum computing. Second, photon entanglement can be encoded as a superposition state of a single photon in a higher-dimensional state space afforded by LM.

Additionally, recent advances in holographic glass technology enable the formation of such devices. For example, the present inventors have found, based on theoretical and numerical results, that more recent incarnations of photo-thermal refractive (PTR) glasses, such as those produced by Optigrate, provide excellent mediums for forming holographic elements to support QIP in accordance with the various embodiments.

The various embodiments provide several advantages over conventional methods of realizing photon-based QIP. First, conventional applications of LOQC to quantum gates generally require a cascade of interferometers which are generally unstable and thus impractical. In contrast, the various embodiments "lock" these interferometers within a tempered piece of glass that is resistant to environmental factors. Second, constructing simple quantum algorithms and quantum gates in volume holograms provides substantially greater optical stability than the equivalent optical bench realization. Often, conventional quantum operators require a cascade of interferometers where the output of one interferometer is used as the input of the next. Therefore, as the dimension of each state space increases, it becomes exceedingly hard to stabilize and is simply impractical beyond two qubits. Other approaches, such as crossed thin gratings, can provide stability but lack the efficiency needed for QIP.

In contrast, devices in accordance with the various embodiments achieve this in a compact optical element without the problem of misalignment. Thus, these devices can replace "fixed" optical components for a broad spectrum of classical and quantum photonics experiments. As result, the various embodiments can be an enabling technology for constructing small, lightweight, field deployable, inexpensive, and low-dimensional quantum computer devices using existing photonics technology.

The present inventors recognize that even though the approaches presented herein may not be scalable, the utility and robustness of optical elements in accordance with the various embodiments for broader quantum information processing applications can be substantial. There are thus many facets of a quantum computer other than the quantum CPU that could take advantage of this technology, including, but not limited to, error correction, QKD relays, quantum memory management tasks and the like.

A. Volume Holographic Gratings

Volume holography is generally used for two-dimensional image storage and typically utilizes on the order of 400 pixels/$\mu m^2$, which consumes only about 1% of the theoretical volumetric storage density ($1/\lambda^3$). Thicker holograms have more precise angular selectivity, i.e. its ability to differentiate the difference between two plane waves separated by a small angle, and under certain well-known conditions can achieve near perfect efficiency. In general, a hologram is considered a volume hologram if its thickness $d \ll \Lambda^2/\lambda$ where $\Lambda$ is the characteristic period of the index of refraction of the grating, and $\lambda$ is the wavelength of the light. Volume holography enables higher storage densities, and under suitable recording configurations can achieve near perfect efficiencies. This is not possible with thin holograms and planar gratings (spatial light modulators) where efficiencies typically peak at around 33%.

Briefly, the overall methodology for forming optical elements in accordance with the various embodiments is substantially similar to that for forming conventional holograms. That is a combination of signal beams and reference beams. However, the various embodiments utilize a particular set of signal beams for forming the hologram. Specifically, holograms utilized in the various embodiments are formed when a signal plane wave, $\langle \vec{r}|S\rangle = A(\vec{r})e^{i\Phi(\vec{r})}$ is directed into a holographic material and made to coherently interfere with a reference plane wave, $|R\rangle$. This is illustrated with respect to FIGS. 2A and 2B.

Figure 2A:
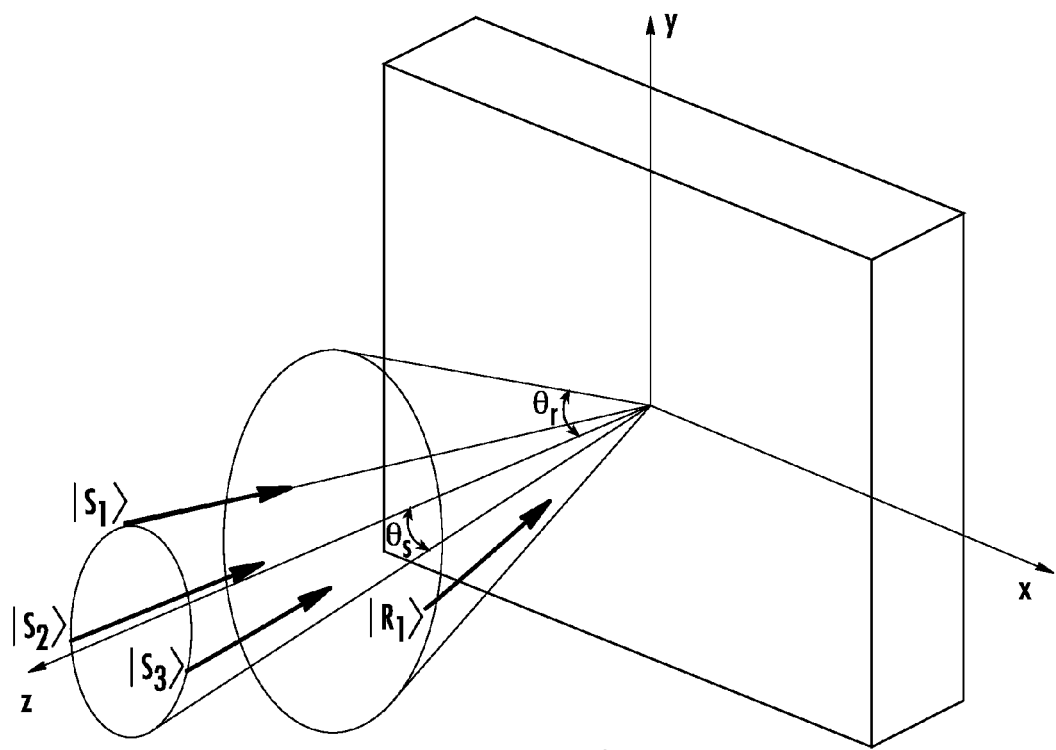
FIG. 2A is a schematic illustration of a recording of a volume transmission grating by the coherent superposition of a plane reference wave $|R_1\rangle$ and a linear superposition of three signal waves $|S\rangle = e^{i\alpha_1}|S_1\rangle + e^{i\alpha_2}|\beta S_2\rangle + e^{i\alpha_3}|S_3\rangle$.
Figure 2B:
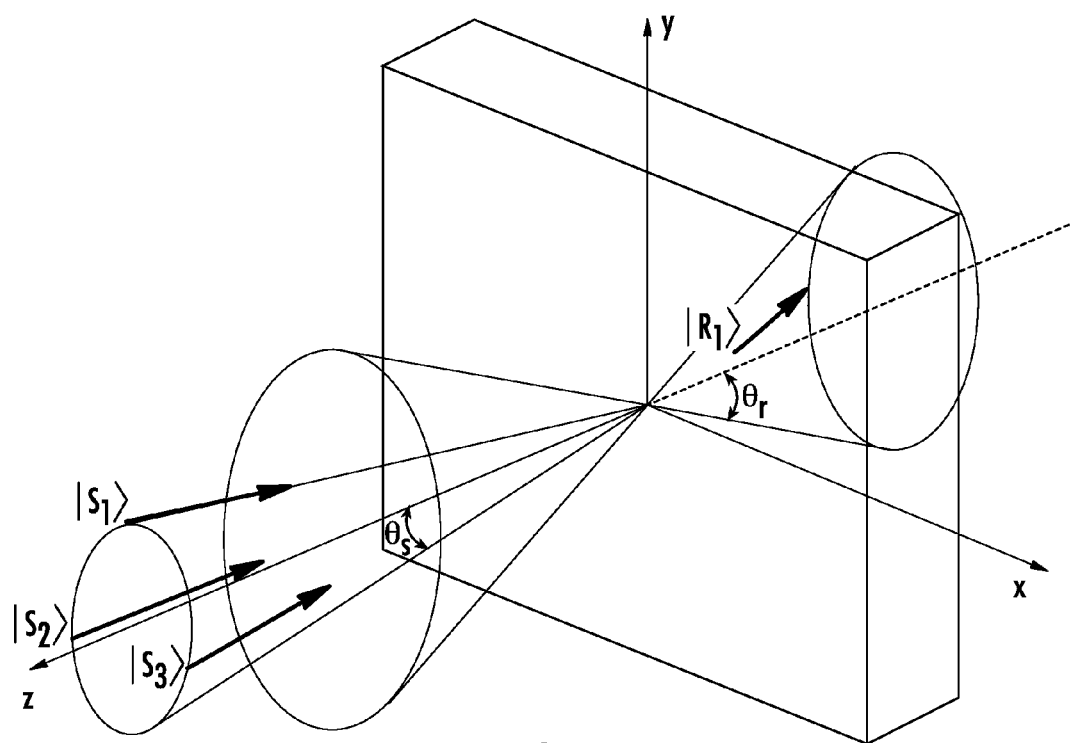
FIG. 2B is a schematic illustration of the operation of the hologram recorded in FIG. 2A.

FIG. 2A is a schematic illustration of a recording of a volume transmission grating by the coherent superposition of a reference plane wave $|R_1\rangle$ and a linear superposition of three signal plane waves $|S\rangle = e^{i\alpha_1}|S_1\rangle + e^{i\alpha_2}|\beta S_2\rangle + e^{i\alpha_3}|S_3\rangle$. FIG. 2B is a schematic illustration of the operation of the hologram recorded in FIG. 2A for QIP. Specifically FIG. 2B shows that, if the identically oriented signal plane wave $|S\rangle$ is sent into the hologram then the reference plane wave, $|R_1\rangle$, will be reconstructed in the diffraction pattern output by the hologram. The diffraction pattern will ordinarily consist of higher order diffracted modes parallel to the signal state. However, for a suitably tuned volume hologram, perfect efficiency can be achieved, as shown in FIG. 2B. In particular, tuning is provided in the various embodiments by constraining the signal plane wave components to a cone of half angle $\theta_s$ centered on the normal to the hologram face, as shown in FIGS. 2A and 2B.

In FIGS. 2A and 2B the signal plane wave is a superposition of N plane waves $$\langle \vec{r}|S\rangle = \sum_{i=1}^{N}\langle \vec{r}|S_i\rangle = \sum_{i=1}^{N} e^{i\alpha_i}e^{i\vec{k}_i\cdot\vec{r}}, \quad (1)$$

where $\alpha_i$ are pure phase angles. In the various embodiments, only planar reference waves need to be considered and the signal state is simply the superposition of these plane waves. Ordinarily the signal plane waves will have variable phase and amplitude modulations. However, after the hologram is developed and the identical signal wave, $\langle \vec{r}|S\rangle$, is directed into the hologram, then for a perfectly tuned hologram, the reference plane wave, $\langle \vec{r}|R\rangle$, should emerge from the hologram as illustrated in FIG. 2B. However, if the hologram is not tuned, then other diffracted orders, e.g., modes parallel to the signal states, may emerge.

Accordingly to form a perfectly tuned hologram within the coupled mode theory, near perfect efficiencies can be obtained if (1) the hologram thickness is tuned to its optimal thickness, (2) if the each of the signal's Fourier wave vectors has the same projection onto the normal to the hologram surface, i.e., they all lie on a cone with half angle $\theta_s$ as shown in FIGS. 2A and 2B, and (3) each of the reference plane waves lie on their own distinct cone concentric with the first, with half angle $\theta_r$ and centered on the normal to the hologram face.

The cone opening angles for the signal states and reference states can be chosen with efficiency and Bragg selectivity issues in mind. Further, the larger the difference in cone angles that finer spaced the Bragg planes will be within the hologram. However, one should take care not to exceed the scalar diffraction limits.

In the case of multiplex holograms wherein multiple independent exposures are made within the holographic material before it is developed, the present inventors have found that using coupled-mode theory, if the signal plane waves $\{S_i\}_{i, 1, 2 \ldots, N}$ form an orthogonal set under the $L_2$ norm in the plane perpendicular to the waves propagation direction (z), i.e.

$$\langle S_i|S_j\rangle = \eta S_i^*(x,y)S_j(x,y)dxdy = \delta_{ij}, \quad (2)$$

then perfect efficiency can be achieved for each of the signals.

A volume multiplexed hologram that has achieved perfect efficiency (within coupled-mode theory) under the "3+1" conditions outlined above thus provides a linear map between signal and reference modes. Physically it represents a projection (or redirection) operator or signal state sorter, $$P = |R_1\rangle\langle S_1| + |R_2\rangle\langle S_2| + \ldots + |R_N\rangle\langle S_N|, \quad (3)$$

uniquely identifying each pair of signal and reference plane waves.

Although the index of refraction within the hologram can be rather complicated, optical components in accordance with the various embodiments operates as strictly linear optical components. Therefore, the diffraction patterns for a beam of photons will correspond exactly to the probability distribution for a single photon in the beam. Further, for ease of illustration, a low number Fock states has been assumed. However, the various embodiments are not limited in this regard.

Now turning to some explicit details, the next two sections describe (1) how to encode a d-partite quantum state onto a single photon that can be used in volume holography, and (2) how the unitary operation representing an entire quantum algorithm can be encoded in a multiplexed hologram.

B. Encoding a D-Partite State on a Single Photon

The dimension, N, of a quantum state space spanned by the direct product of d qubits grows exponentially, $N=2^d$. Thus to represent a single d-partite state by a single photon requires vastly more quantum numbers than available to its two polarization degrees of freedom. However, the photon can be characterized by its extrinsic properties as characterized by its wavefront amplitude and phase. The potential of extending photon-based quantum information processing and quantum computing to higher dimensions was made possible when others described a fundamental quantum experiment utilizing a photon's orbital angular momentum (OAM), and that Laguerre-Gaussian light beams that possessed a quantized orbital angular momentum (OAM) of $1\hbar$ per photon. This opened up an arbitrarily high dimensional quantum space to a single photon. Following these discoveries, it was unequivocally demonstrated the quantum nature of photon OAM by showing that pairs of OAM photons can be entangled using the non-linear optical process of parametric down conversion.

Shortly thereafter, a scheme was introduced to prepare photons in multidimensional vector states of OAM commencing higher-dimensional QIP, with applications to quantum key distribution. Recently a practical method has been demonstrated to produce such MUB states using computer-generated holography with a single spatial light modulator (SLM).

While photons with specific values of OAM have been emphasized recently in the literature, one can equally well utilize any other extrinsic set of orthogonal basis functions for higher-dimensional QIP, e.g., energy, linear momentum, and angular momentum. While OAM states respect azimuthal symmetry, transverse or linear momentum (LM) states respect rectilinear symmetry. Independent of the representation selected, the mutually unbiased (MUB) states will ordinarily be modulated in both amplitude and phase.

While the advantage of higher-dimensional QIP lies in its ability to increase bandwidth while simultaneously tolerating a higher bit error rate (BER), such transverse photon wave functions are more fragile to decoherence under propagation than the photon's spin wave function, and the divergence of the states in propagation may require larger apertures. However, since the spatial distances within a quantum computer are small this is not a concern here. This is not the case for quantum key distribution. Rather, the present inventors have determined that the efficiencies one can achieve with holographic elements exposed by LM plane waves and their superposition (volume Bragg gratings) is substantially higher than that for photon wavefronts exhibiting OAM. Multiplexed volume Bragg gratings have been thoroughly addressed in the literature. Since the efficiencies are potentially higher, and volume Bragg gratings are well understood, the present inventors have focused on approaches relying on the orthonormal transverse photon states of LM.

Figure 3:
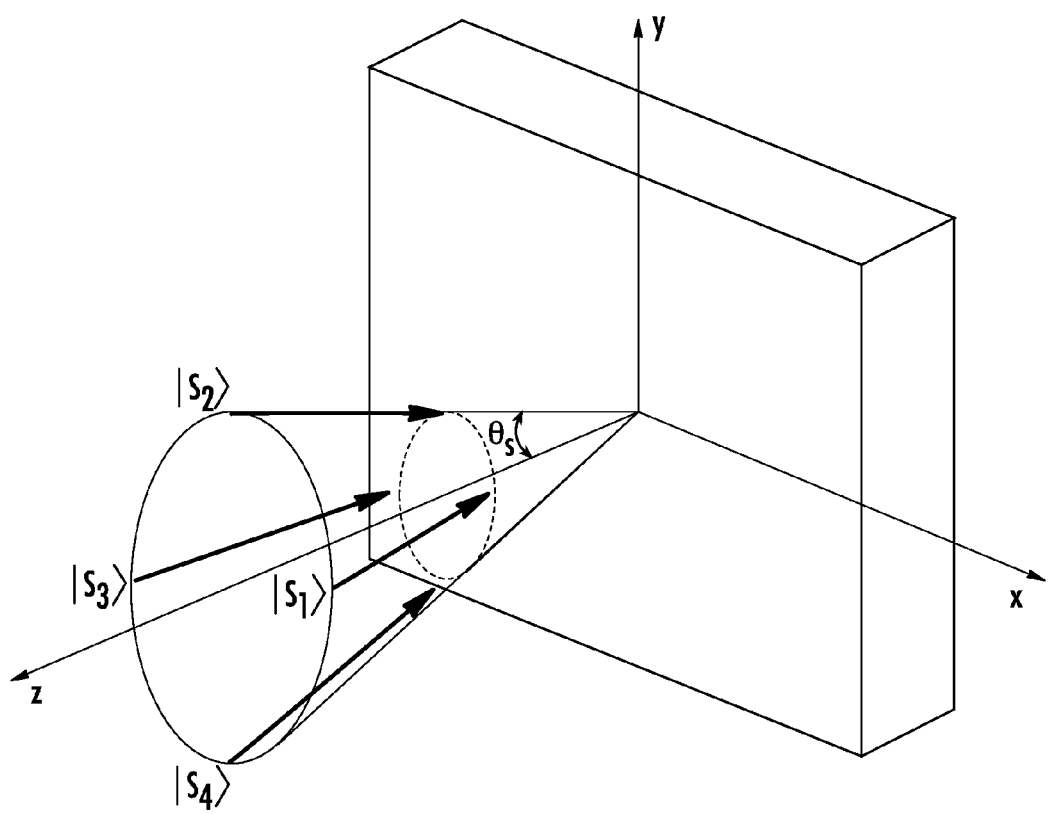
FIG. 3 is a schematic illustration showing four LM states (arrows) that lie on a cone are used to generate a bipartite, or 4-dimensional signal state space.

In developing the various embodiments, the present inventors have focused on the physics of transverse or LM states. As shown in FIG. 3, the present inventors propose quantizing the LM within the 2-dimensional plane of the face of the hologram.

FIG. 3 is a schematic illustration showing four LM states (arrows) that lie on a cone are used to generate a bipartite, or 4-dimensional signal state space. The eigenstates (each a plane wave) in this 8-dimensional space are chosen to have eigenvectors, $|S_i\rangle = |\theta_s, \phi_i\rangle$ i∈1, 2, 3, 4, here $\phi_1=0$, $\phi_2=\pi/2$, $\phi_3=\pi$ and $\phi_4=3\pi/2$. This can be generalized to higher dimensions, $2^d$, by introducing d eigenstates around the cone, as long as the angular selectivity of the hologram is less than $\Delta\phi=2\pi/2^d$. The wave vectors are defined in Eq. 4 below.

Bragg gratings can obtain perfect efficiencies as long as the component perpendicular to the face of the hologram ($k_\perp$) for each of the photons' momentum are the same, i.e., the plane wave states must lie on a cone. In addition the thickness of the hologram must be carefully chosen. Therefore, if one represents a d-partite state by a single LM photon, at least $N=2^d$ LM states are required around the cone of half angle $\theta_s$ centered on the normal to the hologram's face. As a result, one can freely choose as the computational quantum state basis any $2^d$ non-collinear plane waves. In this case, integer quantum numbers will be the azimuthal angles, $\phi_i$, i∈$\{1, 2, \ldots 2^d\}$ locating the wave vector of the photon around the cone. For purpose of this discussion, the hologram surface is assumed to be in the x-y plane. For photons of wavenumber k these waves correspond to a transverse linear momentum $p_P = \sin(\theta_s)\hbar k = \hbar k_P$, with components $p_i^x = \sin(\phi_i) \hbar k_P$, $p_i^y = \cos(\phi_i) \hbar k_P$ and $p_i^z = \cos(\theta) \hbar k = \hbar k_\perp$=constant; respectively. Here, $k_P = k(\lambda/D)$ is the magnitude of the transverse component of the wave vector of a plane wave of wavelength λ with one "wave of tilt" (λ/D) across the aperture of breadth D.

In the frame of the hologram, and in units where the speed of light is unity, the components of the 3-momentum, $\vec{p} = \{p^x, p^y, p^z\}$, for each of our $2^d$ photons can be expressed in terms of their wavenumber, (k), i.e., $$\vec{p} = \hbar \vec{k}_i = \hbar \{k_i^x, k_i^y, k_i^z\} = \hbar k\{\sin(\theta)\cos(\phi_i), \sin(\theta)\sin(\phi_i), \cos(\theta_s)\}. \quad (4)$$

These $N=2^d$ plane wave states, $\langle \vec{r}|S_i\rangle = e^{i\vec{k}_i \cdot \vec{r}}$ define the computational basis for quantum information processing.

$$\text{MUB}=\{|S_1\rangle, |S_2\rangle, \ldots |S_N\rangle\} \quad (5)$$

Each of these states represents a transverse Fourier mode of a photon; that is they are orthogonal under the $L^2$ norm ($\langle S_i|S_j\rangle = \delta_{ij}$) and span the $2^d$-dimensional state space.

C. Redirecting States in a Computational Basis from Reference to State Space

Section A describes that under certain conditions perfect efficiency (within coupled-mode theory) can be achieved. Further, it is described that a multiplexed hologram could function as a d-partite version of the more familiar qubit polarizing beam splitter, i.e. a single optical element that can efficiently sort each of the d-partite states in the MUB, or computational basis (Eq. 5). Further, thick holographic gratings fortunately produce high diffraction efficiency in the first order. If several predominant diffracted orders are required, as is the case for sorting, several independent fringe structures can coexist within the holographic material. Such multiplexed holograms have been used for multiple-beam splitters and recombiners, and more recently for wide-angle beam steering. Additionally, a MUB-state sorter based on a multiplexed thick holographic element constructed from commercially available photo thermal refractive (PTR) glass has been previously described. Due to the unique properties of PTR glass the grating's thickness can approach several mm and be highly Bragg selective. There is evidence that such sorters can be highly efficient, with Bragg efficiency >95%. Further, the present inventors have discovered, through simulations and empirical data on thick Bragg gratings, that they may provide an adequate solution to this critical sorting and beam steering problem for "single photon" QIP.

While the signal state sorter, Eq. 3, can be constructed in a multiplexed volume hologram under the strict conditions outlined in Section A, one could just as well construct a multiplexed volume Bragg transmission hologram, R, that recombines a beam, i.e., maps the reference waves onto their corresponding signal states. Mathematically that is the Hermitian conjugate of Eq. 3, $$R = P^\dagger = |S_1\rangle\langle R_1| + |S_2\rangle\langle R_2| + \ldots + |S_n\rangle\langle R_n|. \quad (6)$$

This can be constructed physically using the same hologram used for P, but instead of directing the signal waves to the hologram to reconstruct the corresponding reference wave, one could direct a reference wave which will reconstruct the desired superposition of signal wave states, i.e., the signal beam, $|S\rangle$. For example, two identical multiplexed holograms (P) stacked back-to-back would represent the identity operator, I, on this state space. Any signal wave used to record the hologram emerges unchanged from the holographic sandwich; however, within the holographic material it will undergo a complicated evolution into the reference states, $|R_i\rangle$, and back. Though, this identity gate may not be particularly useful in its own right, it does help illustrate our point. As shown in the examples below, these holographic state redirection elements (Eq. 3) can be useful in the construction of practical quantum computing gates.

EXAMPLES

The following non-limiting Examples serve to illustrate selected embodiments of the invention of the invention. It will be appreciated that variations in proportions and alternatives in elements of the components shown will be apparent to those skilled in the art and are within the scope of embodiments of the invention.

Quantum Teleportation in Glass

A first example of how a quantum algorithm can be encoded within a single hologram can be demonstrated by an exemplary encoding of a quantum teleportation (QT) algorithm. This three qubit gate lives in an 8-dimensional state space. It exhibits all the essential features described above, i.e., entanglement and conditional measurements. Although this approach described below is directed specifically to quantum teleportation, the approach here will generalize, in principle, to any quantum circuit model.

The standard experimental realization of QT utilizes a pair of entangled qubits, $|\beta_{00}\rangle$, and an arbitrary qubit state vector to be teleported, $\psi$, where, $$|\beta_{00}\rangle = \frac{1}{\sqrt{2}}(|00\rangle + |11\rangle) \quad (7)$$

$$\psi = \alpha|0\rangle + \beta|1\rangle \quad (8)$$

Figure 4:
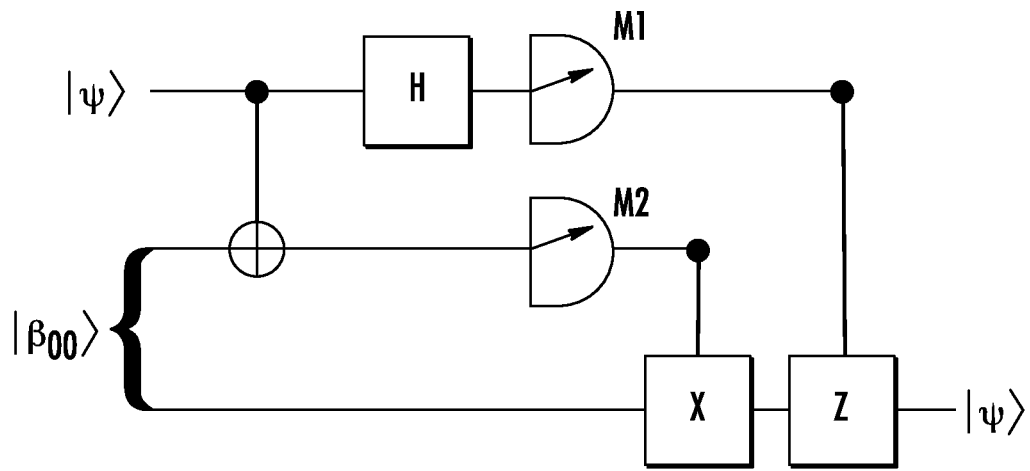
FIG. 4 shows an exemplary quantum teleportation circuit.

The QT circuit consists of a CNOT gate, a Hadamard gate as well as two conditional measurements, one of which is fed into a first Pauli gate, the other into a second Pauli gate as shown in FIG. 4.

FIG. 4 shows an exemplary quantum teleportation circuit. Here the 8-dimensional tripartite input state $|IN\rangle = |\psi\rangle \otimes |\beta_{00}\rangle$ is the direct product of the arbitrary qubit state, $|\psi\rangle = 1/\sqrt{2}(|00\rangle + |1\rangle)$ to teleport, and a maximally entangled pair of qubit states $|\beta_{00}\rangle = 1/\sqrt{2}(|00\rangle + |11\rangle)$. This circuit is composed of an initial CNOT operation (⊕), followed by a Hadamard gate (H), and two Pauli transformations (X and Z) conditioned on two measurements (M1 and M2).

Figure 5:
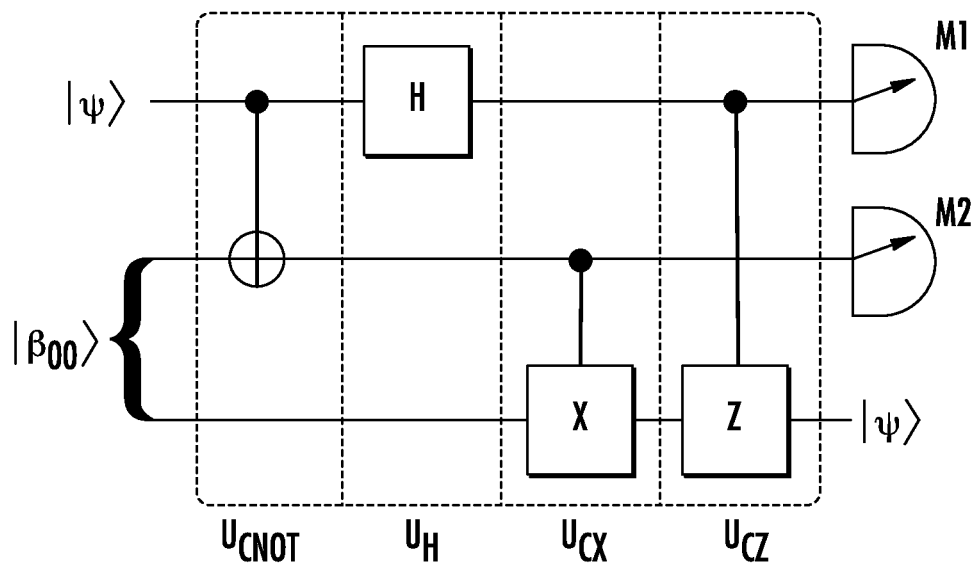
FIG. 5 shows a diagram of the equivalent quantum teleportation circuit.

The "timelessness" of quantum computing is exploited by using the principle of deferred measurements and commutes the two measurements in FIG. 4 with the quantum X and Z gates. One can then arrive at an equivalent circuit model for QT where all measurements are made at the end, as illustrated in FIG. 5. FIG. 5 shows a diagram of the equivalent to the quantum teleportation circuit for FIG. 4. The "principle of deferred measurement" is used and the time ordering of the conditional measurements is commuted with the last two Pauli gates. This emphasizes the "timeless" feature of quantum information processing. Further, the QT circuit becomes a single unitary transformation followed by two measurements and the transported state (top wire→bottom wire).

For purposes of the foregoing discussion, the focus in this section on this equivalent tripartite QT circuit. Essentially QT amounts to (1) performing a unitary transformation on the input tripartite state followed by, (2) two measurements, $$|OUT\rangle = U_{QT}|IN\rangle, \quad (9)$$

where $$|IN\rangle = |\psi\rangle \otimes |\beta_{00}\rangle. \quad (10)$$

This unitary transformation, $U_{QT}$, can be decomposed into a product of four sequential unitary transformations as illustrated by the dashed box shown in FIG. 5. Evolution proceeds from the left to the right. The input state first encounters (1) a CNOT gate on the first two qubits with unitary transformation, $U_{CNOT}$, followed by (2) a Hadamard transformation on the first qubit with unitary operator, $U_H$, followed by (3) a Pauli X gate on the third qubit conditioned on the second qubit with unitary transformation, $U_{CX}$, and finally (4) a Pauli Z gate on the third qubit conditioned on the first qubit with unitary transformation, $U_{CZ}$. One can therefore write the overall QT unitary transformation as a product of these four transformations, $$U_{QT} = U_{CZ} U_{CX} U_H U_{CNOT} \quad (11)$$

This 8-dimensional state space can be interpreted as a direct product of 3 qubit states (Eq. 10) with entanglement in the last two qubits (Eq. 7). However, one can also represent the tripartite state as a pure state in an 8-dimensional state space without loss of generalization. In this way the entire input state (Eq. 10) can be represented by a single photon in an 8-dimensional LM eigenspace as described in Section C above. Thus, one just needs to define a correspondence between a state in the computational basis and one of the LM eigenstates (Eq. 5). This identification is described below.

It is convenient for purposes of the various embodiments, to represent the equivalent QT algorithm in matrix notation. In the standard representation of the qubits, this is $$|0\rangle = \begin{pmatrix} 1 \\ 0 \end{pmatrix} \text{ and } |1\rangle = \begin{pmatrix} 0 \\ 1 \end{pmatrix}. \quad (12)$$

The two input states can then be expressed as vectors in a 2 and 4 dimensional state space; respectively, $$|\psi\rangle = \begin{pmatrix} \alpha \\ \beta \end{pmatrix}, \quad (13)$$

$$|\beta_{00}\rangle = \frac{1}{\sqrt{2}} \begin{pmatrix} 1 \\ 0 \\ 0 \\ 1 \end{pmatrix}. \quad (14)$$

Therefore the input state can be expressed as a vector in an 8-dimensional state space, $$|IN\rangle = |\psi\rangle \otimes |\beta_{00}\rangle = \frac{1}{\sqrt{2}} \begin{pmatrix} \alpha \\ 0 \\ 0 \\ \alpha \\ \beta \\ 0 \\ 0 \\ \beta \end{pmatrix}. \quad (15)$$

Following the definitions of Section B above, one can freely choose the following computational basis vectors in this 8-dimensional state space and their correspondence to each of eight "signal" LM plane waves:

$$\langle \vec{r} | S_1 \rangle = e^{i\vec{k}_1 \cdot \vec{r}} \Leftrightarrow \begin{pmatrix} 1 \\ 0 \\ 0 \\ 0 \\ 0 \\ 0 \\ 0 \\ 0 \end{pmatrix}, \quad (16)$$

$$\langle \vec{r} | S_2 \rangle = e^{i\vec{k}_2 \cdot \vec{r}} \Leftrightarrow \begin{pmatrix} 0 \\ 1 \\ 0 \\ 0 \\ 0 \\ 0 \\ 0 \\ 0 \end{pmatrix}, \ldots ,$$

$$\langle \vec{r} | S_8 \rangle = e^{i\vec{k}_8 \cdot \vec{r}} \Leftrightarrow \begin{pmatrix} 0 \\ 0 \\ 0 \\ 0 \\ 0 \\ 0 \\ 0 \\ 1 \end{pmatrix}.$$

The quantum numbers of the "signal" state, $$|S_i\rangle = |k_i^P\rangle \quad (17)$$

represent the projection of the linear momentum of the photon onto the face of the hologram, i.e., the transverse components of the LM. There would ordinarily be two components of this momentum, $|S_i\rangle |k_i^\perp k_i^P\rangle$, hence two quantum numbers. However, here each of these eight signal plane waves lie on a cone of half angle $\theta_s$. Therefore, the first quantum number is constant for all states, $$k_i^\perp = k^\perp = \text{constant}, \forall i. \quad (18)$$

One can then define the transverse quantum numbers by equally spacing the states around the cone's perimeter with $\phi_1 = 0$ and $\Delta\phi = \pi/4$. This is a generalization to eight plane waves of the four wave configuration illustrated in FIG. 3. Therefore, one can say each state is described by two quantum numbers, $\theta$ and $\phi$; however, $\theta$ is held fixed so that the holograms can achieve perfect efficiency (within coupled mode theory) in modeling a given unitary transformation. This will be described in further detail below.

The input state (Eq. 15) is then a linear superposition of four of the eight computational basis vectors; and correspondingly, can be represented by a linear superposition of four plane wave state vectors, $$|IN\rangle = \frac{1}{\sqrt{2}} (\alpha |S_1\rangle + \alpha |S_4\rangle + \beta |S_5\rangle + \beta |S_8\rangle). \quad (19)$$

This state has a wavefront with both amplitude and phase variations. In a similar vein one can define a corresponding set of eight reference plane waves that will be used to construct the holograms. These can be defined similar to the signal waves, but on a separate concentric cone of half angle, $\theta_r \neq \theta_s$, $$\langle \vec{r} | R_1 \rangle = e^{i\kappa_1 \cdot r}, \langle \vec{r} | R_2 \rangle = e^{i\kappa_2 \cdot r}, \ldots, \langle \vec{r} | R_8 \rangle = e^{i\kappa_8 \cdot r}. \quad (20)$$

Similarly, each of these reference waves can be provided on the a second cone of half angle $\theta_r \neq \theta_s$ and are equally spaced, but offset with respect to the signal waves, around its perimeter with $\phi_1 = \pi$ and $\Delta\phi = \pi/4$. It is important to note that the exact placement of the eigenstates around the cones and relative relationships between the reference waves and the signal waves are unimportant within the couple-mode theory. Any configuration can yield perfect efficiency. However, in practice it is preferable to make the angular separation between the signal and reference waves as large as possible, since this can lead to higher angular selectivity and higher efficiencies.

In principle, azimuthal angles can be assigned to each of the n signal waves as well as for each of the n reference waves as desired specifiable as long as they differ from one another by the Bragg selectivity angle. However, uniform placement of these signals around the cone should yield maximal relative angles and hence highest efficiency.

These basis vectors can then be used to construct each of the four unitary transformations shown in the dashed boxes of FIG. 5, thereby yielding a representation of the overall QT unitary transformation, $U_{QT}$, given by Eq. 11. In particular one would find, $$U_{CNOT} = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 1 & 0 & 0 & 0 \\ 0 & 0 & 0 & 0 & 0 & 1 & 0 & 0 \end{pmatrix}, \quad (21)$$

$$U_H = \frac{1}{\sqrt{2}} \begin{pmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 1 & 0 & 0 & 0 & -1 & 0 & 0 & 0 \\ 0 & 1 & 0 & 0 & 0 & -1 & 0 & 0 \\ 0 & 0 & 1 & 0 & 0 & 0 & -1 & 0 \\ 0 & 0 & 0 & 1 & 0 & 0 & 0 & -1 \end{pmatrix},$$

as well as, $$U_{CX} = \begin{pmatrix} 1 & 0 & 0 & 0 & 0 & 0 & 0 & 0 \\ 0 & 1 & 0 & 0 & 0 & 0 & 0 & 0 \\ 0 & 0 & 0 & 1 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 0 & 1 \\ 0 & 0 & 0 & 0 & 0 & 0 & 1 & 0 \end{pmatrix}, \quad (22)$$

$$U_{CZ} = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & -1 & 0 & 0 & 0 \\ 0 & 0 & 0 & 0 & 0 & -1 & 0 & 0 \\ 0 & 0 & 0 & 0 & 0 & 0 & -1 & 0 \\ 0 & 0 & 0 & 0 & 0 & 0 & 0 & -1 \end{pmatrix}.$$

Therefore, in this computational basis, the unitary transformation representing the QT can be obtained by substituting Eqs. 21-22 into Eq. 11 to yield:

$$U_{QT} = \frac{1}{\sqrt{2}} \begin{pmatrix} 1 & 0 & 0 & 0 & 0 & 0 & 1 & 0 \\ 0 & 1 & 0 & 0 & 0 & 0 & 0 & 1 \\ 0 & 0 & 0 & 1 & 0 & 1 & 0 & 0 \\ 0 & 0 & 1 & 0 & 1 & 0 & 0 & 0 \\ -1 & 0 & 0 & 0 & 0 & 0 & 1 & 0 \\ 0 & -1 & 0 & 0 & 0 & 0 & 0 & 1 \\ 0 & 0 & 0 & -1 & 0 & 1 & 0 & 0 \\ 0 & 0 & -1 & 0 & 1 & 0 & 0 & 0 \end{pmatrix} \quad (23)$$

This unitary transformation of the equivalent QT circuit shown in FIG. 5 accomplishes the desired transformation, $$|IN\rangle = \underbrace{\psi}_{\substack{top \\ wire}} \otimes \underbrace{|\beta_{00}\rangle}_{\substack{bottom \\ two\ wires}} \Rightarrow |OUT\rangle = \quad (24)$$

$$U_{QT}|IN\rangle = \underbrace{\left(\frac{|1\rangle - |0\rangle}{\sqrt{2}}\right)}_{top\ wire} \otimes \underbrace{\left(\frac{|1\rangle + |0\rangle}{\sqrt{2}}\right)}_{middle\ wire} \otimes \underbrace{\psi}_{\substack{bottom \\ wire}},$$

thereby teleporting the state function from the top wire to the bottom wire.

Now turning to how to encode the unitary transformation, $U_{QT}$ into a single holographic element. By construction, the rows of $U_{QT}$ form an orthonormal basis that spans the 8-dimensional state space. Each of these rows can be expressed as a superposition of the computational basis state vectors of Eq. 16. For this example, each row requires a superposition of exactly two of the eight computational basis state vectors. Therefore, each row can be represented as a linear superposition of the corresponding (Eq. 16) plane wave states—two plane waves each for this particular quantum circuit. For example, if one considers the state vector representing each of the rows of the matrix in Eq. 23, one can construct each of the eight QT signal states, $|\Sigma_i\rangle$ that we will use in the successive recordings in the hologram, $$\left|\sum\nolimits_1\right\rangle = \frac{1}{\sqrt{2}}(|S_7\rangle + |S_1\rangle) \Leftrightarrow U^\dagger_{QT_{1,j}} \quad (25)$$

$$\left|\sum\nolimits_2\right\rangle = \frac{1}{\sqrt{2}}(|S_8\rangle + |S_2\rangle) \Leftrightarrow U^\dagger_{QT_{2,j}} \quad (26)$$

$$\left|\sum\nolimits_3\right\rangle = \frac{1}{\sqrt{2}}(|S_6\rangle + |S_4\rangle) \Leftrightarrow U^\dagger_{QT_{3,j}} \quad (27)$$

$$\left|\sum\nolimits_4\right\rangle = \frac{1}{\sqrt{2}}(|S_5\rangle + |S_3\rangle) \Leftrightarrow U^\dagger_{QT_{4,j}} \quad (28)$$

$$\left|\sum\nolimits_5\right\rangle = \frac{1}{\sqrt{2}}(|S_7\rangle - |S_1\rangle) \Leftrightarrow U^\dagger_{QT_{5,j}} \quad (29)$$

$$\left|\sum\nolimits_6\right\rangle = \frac{1}{\sqrt{2}}(|S_8\rangle - |S_2\rangle) \Leftrightarrow U^\dagger_{QT_{6,j}} \quad (30)$$

$$\left|\sum\nolimits_7\right\rangle = \frac{1}{\sqrt{2}}(|S_6\rangle - |S_4\rangle) \Leftrightarrow U^\dagger_{QT_{7,j}} \quad (31)$$

$$\left|\sum\nolimits_8\right\rangle = \frac{1}{\sqrt{2}}(|S_5\rangle - |S_3\rangle) \Leftrightarrow U^\dagger_{QT_{8,j}}. \quad (32)$$

By, inspection one can reconfirm that these eight basis vectors form an orthonormal basis spanning the 8-dimensional state space.

Figure 6:
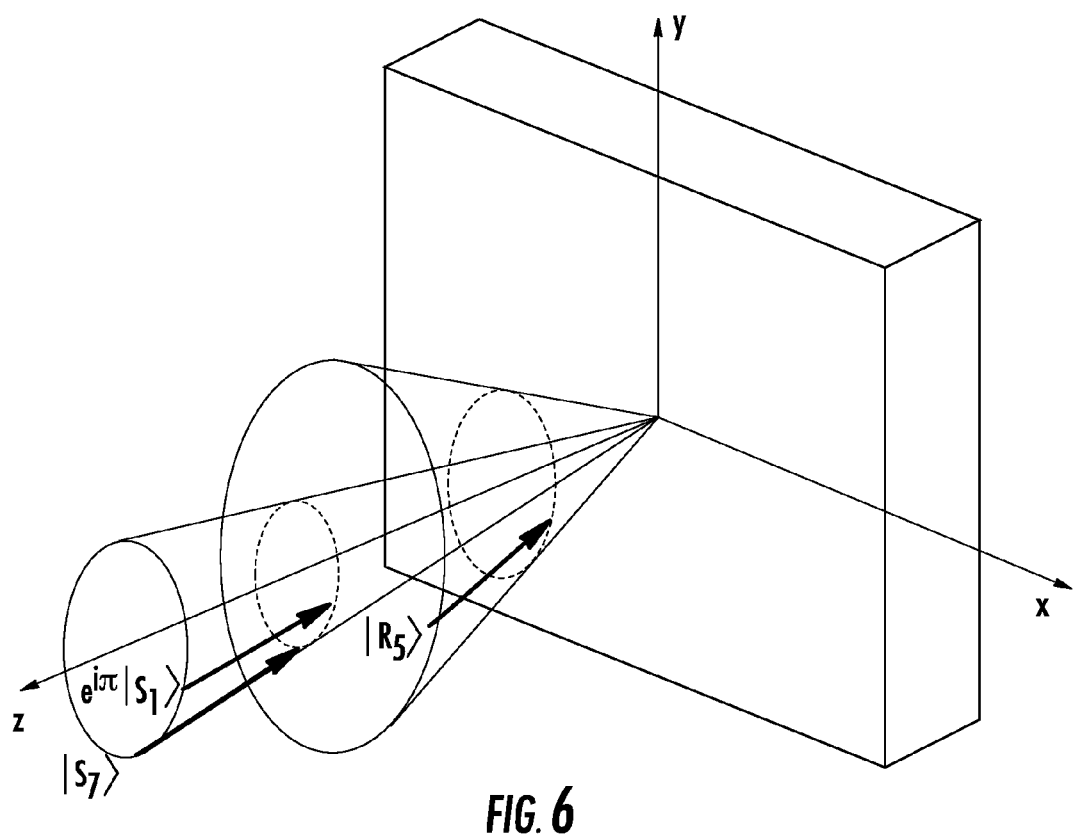
FIG. 6 is a schematic illustrating the volume holographic design of the fifth of eight independent recordings used to generate the QT unitary transformation, $U_{QT}$, in PTR glass.

A coordinate system is then constructed where the z-axis is orthogonal to the face (the x-y plane) of the hologram. A faithful holographic representation of $U_{QT}$ can then be achieved by multiplexing eight recordings within the holographic material. The hologram is recorded so that each row of the unitary matrix, $U_{QT}$, is used to generate its own volume holographic grating. A qubit gate such as the Hadamard gate (H) is represented by a 2×2 matrix and would ordinarily require two recordings. A 2-qubit gate such as the controlled-not gate CNOT is represented by a 4×4 matrix and would ordinarily require four independent recordings (this will be discussed in the next section). The qutrit QT circuit is represented by a 8×8 dimensional matrix (Eq. 23) and requires the following eight sets of independent recordings, between each of the signal states in Eqs. 25-32 and its corresponding reference plane wave of Eq. 20 as follows:

1. The first recording is made by the coherent superposition of signal state $\langle \vec{r}|\Sigma_1\rangle$ and reference state $\langle \vec{r}|R_1\rangle$;
2. The second recording is made by the coherent superposition of signal state $\langle \vec{r}|\Sigma_2\rangle$ and reference state $\langle \vec{r}|R_2\rangle$;
. . .
3. The eighth and final recording is made by the coherent superposition of signal state $\langle \vec{r}|\Sigma_8\rangle$ and reference state $\langle \vec{r}|R_8\rangle$ The recording geometry for the case of the fifth recording is illustrated in FIG. 6. FIG. 6 is a schematic illustrating the volume holographic design of the fifth of eight independent recordings used to generate the QT unitary transformation, $U_{QT}$, in PTR glass.

Since (1) each of the eight signal states lie on a single cone with axis normal to the face of the hologram and form an orthonormal basis spanning the state space, and (2) each of the eight reference states lie on another concentric cone and span an isomorphic 8-dimensional state space, the oct-tuple multiplexed hologram (within coupled mode theory) faithfully represents the desired transformation, $$\hat{U}_{QT} = \frac{1}{\sqrt{2}}(|R_1\rangle\langle S_1| + |R_1\rangle\langle S_7| + |R_2\rangle\langle S_2| + |R_2\rangle\langle S_8| + |R_3\rangle\langle S_4| +$$
$$|R_3\rangle\langle S_6| + |R_4\rangle\langle S_3| + |R_4\rangle\langle S_5| - |R_5\rangle\langle S_1| + |R_5\rangle\langle S_7| -$$
$$|R_6\rangle\langle S_2| + |R_6\rangle\langle S_8| - |R_7\rangle\langle S_4| + |R_7\rangle\langle S_6| - |R_8\rangle\langle S_3| + |R_8\rangle\langle S_5|).$$

However, this operator maps quantum states in 'signal' space (inner cone of FIG. 6) onto corresponding states in the reference space (outer cone of FIG. 6). In order to map this output back into the corresponding states in the signal one would need to take the diffracted output of the hologram described by Eq. 33 as input to a "redirection" as described by Eq. 6. This can be constructed in a similar fashion by eight recordings, wherein the $i^{th}$ recording is made by the coherent superposition of the $i^{th}$ signal plane wave basis state $\langle \vec{r}|S_i\rangle = e^{i\vec{K}_i \cdot \vec{r}}$ with the $i^{th}$ reference plane wave basis state, $\langle \vec{r}|R_i\rangle = e^{i\vec{K}_i \cdot \vec{r}}$, yielding, $$\hat{R}_{QT} = \sum_{i=1}^{8}|S_i\rangle\langle R_i|. \quad (33)$$

Stacking the redirection hologram behind the hologram for the desired transformation will yield the desired QT operation.

$$\hat{QT} = \hat{R}_{QT}\hat{U}_{QT} =$$

$$\frac{1}{\sqrt{2}}(|S_1\rangle\langle S_1| + |S_1\rangle\langle S_7| + |S_2\rangle\langle S_2| + |S_2\rangle\langle S_8| + |S_3\rangle\langle S_4| + S_3\rangle\langle S_6| +$$

$$|S_4\rangle\langle S_3| + |S_4\rangle\langle S_5| - |S_5\rangle\langle S_1| + |S_5\rangle\langle S_7| - |S_6\rangle\langle S_2| +$$

$$|S_6\rangle\langle S_8| - |S_7\rangle\langle S_4| + |S_7\rangle\langle S_6| - |S_8\rangle\langle S_3| + |S_8\rangle\langle S_5|)$$

The CNOT Gate: Stacking Instead of Multiplexing

Figure 7:
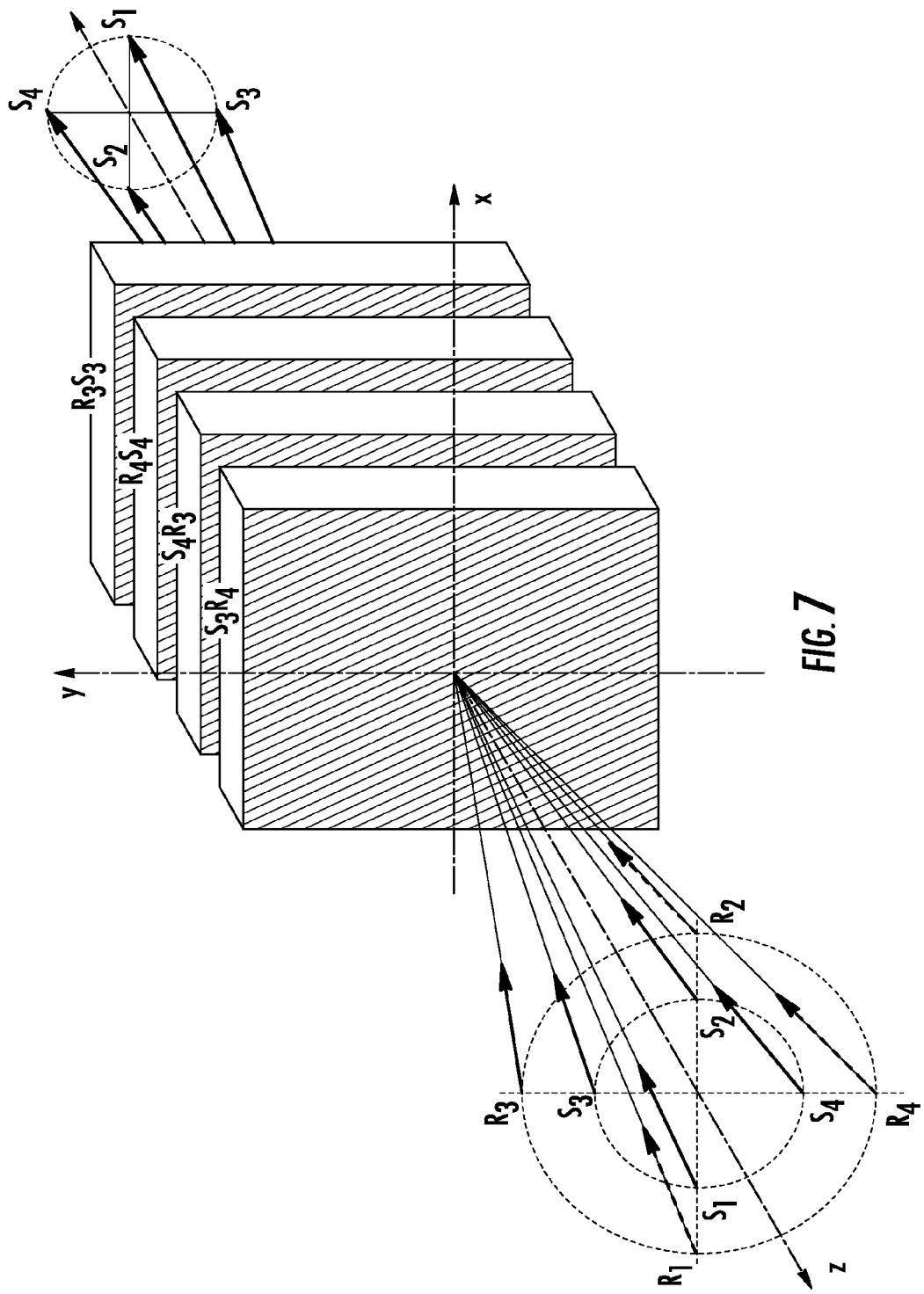
FIG. 7 is a schematic illustration of a volume holographic design of the 4-dimensional CNOT gate in PTR glass.

One alternative to multiplexing is to make single recordings in each of many holograms and to stack the holograms. Here is provided a second illustrative example with a specific design of a quantum CNOT gate compatible with PTR glass. This example will be described with reference to FIG. 7. FIG. 7 is a schematic illustration of a volume holographic design of the 4-dimensional CNOT gate in PTR glass. However, the various embodiments are not limited solely to such a configuration. That is, the same gate can be constructed by a stack of 4 LM gratings, two or more multiplexed gratings, or any combination of LM gratings and multiplexed gratings. In order to achieve a diffraction efficiency of >80% with this stack of gratings, the angle of alignment (or tilt angle) relative to the normal to the front surface of the grating should be within a half angle range, $\delta\theta = \sqrt{3}/2\, ft_0$, where f is spatial frequency of the diffraction grating and $t_0$ is the minimum thickness of grating which can provide 100% diffraction efficiency.

Referring back to the configuration shown n FIG. 7, this gate is realized by stacking four holograms, and which are each described below. The CNOT gate is a two qubit gate. Therefore the dimension of the state space is 4-dimensional. While this state space can be constructed as a product space of qubits by utilizing the polarization states of two correlated photons, it can also be represented by a single LM photon in a 4-dimensional state space. The CNOT gate can be constructed with a single photon. Following the arguments of the previous section, four independent plane waves lying on the cone shown in FIG. 7 are freely chosen. These are associated with independent transverse LM modes the four orthogonal quantum state vectors, $|S_1\rangle$, $|S_2\rangle$, $|S_3\rangle$, and $|S_4\rangle$. Any state vector, $|\psi\rangle$, in this 4-dimensional state space can be written as a linear superposition of these states, $$|\omega\rangle = \alpha|S_1\rangle + \beta|S_2\rangle + \gamma|S_3\rangle + \delta|S_4\rangle, \quad (34)$$

with $$|\alpha|^2 + |\beta|^2 + |\gamma|^2 + |\delta|^2 = 1. \quad (35)$$

Each of the basis states can be expressed in matrix notation, $$|S_1\rangle = \begin{pmatrix} 1 \\ 0 \\ 0 \\ 0 \end{pmatrix}, \quad (36)$$

$$|S_2\rangle = \begin{pmatrix} 0 \\ 1 \\ 0 \\ 0 \end{pmatrix},$$

$$|S_3\rangle = \begin{pmatrix} 0 \\ 0 \\ 1 \\ 0 \end{pmatrix},$$

and $$|S_4\rangle = \begin{pmatrix} 0 \\ 0 \\ 0 \\ 1 \end{pmatrix}.$$

In this computational basis the CNOT gate can then be expressed by the following unitary transformation:

$$CNOT = \begin{pmatrix} 1 & 0 & 0 & 0 \\ 0 & 1 & 0 & 0 \\ 0 & 0 & 0 & 1 \\ 0 & 0 & 1 & 0 \end{pmatrix}. \quad (37)$$

Letting the z-axis be orthogonal to the face (x-y plane) of the hologram, the four volume holographic gratings are recorded by a suitable superposition of the set of four signal plane waves, $$\langle \vec{r}|S_1\rangle = \exp(i\vec{k}_1\cdot\vec{r}), \langle \vec{r}|b\rangle = \exp(ik_2\cdot\vec{r}), \langle |S_2\rangle =$$
$$\exp(i\vec{k}_3\cdot\vec{r}), \text{and } \langle \vec{r}|d\rangle = \exp(ik_4\cdot\vec{r}), \quad (38)$$

and four reference waves, $$\langle \vec{r}|R_1\rangle = \exp(i\vec{\kappa}_1\cdot\vec{r}), \langle \vec{r}|R_2\rangle = \exp(i\vec{\kappa}_2\cdot\vec{r}),$$
$$\langle \vec{r}|R_3\rangle = \exp(i\vec{\kappa}_3\cdot\vec{r}), \text{and } \langle \vec{r}|R_4\rangle = \exp(i\vec{\kappa}_4\cdot r), \quad (39)$$

as shown in FIG. 7.

The hologram is recorded so that each row of the unitary matrix of the CNOT gate is used to generate its own volume holographic grating. For a 2-qubit gate such as the CNOT gate one would ordinarily require four recordings; however, since the first two bits are just an identity matrix one need only two layers to transform the signal states into the desired reference states. In addition to one holographic recording per dimension of the state space, a conjugate of the each grating (two in the case of the CNOT gate) is required in order to transform the diffracted reference waves from the reference waves back into the desired signal states. In particular, the CNOT-gate constructed from four holographic gratings stacked together as is shown in FIG. 7, where:

1. The first grating is recorded with the two coherent plane waves corresponding to states $|S_3\rangle$ and $|R_4\rangle$.
2. The second grating is recorded with the two coherent plane waves corresponding to states $|S_4\rangle$ and $|R_3\rangle$.
3. The third grating is recorded with the two coherent plane waves corresponding to states $|R_4\rangle$ and $|S_4\rangle$.
4. The fourth grating is recorded with the two coherent plane waves corresponding to states $|R_3\rangle$ and $|S_3\rangle$.

The four gates will not diffract the first two signal states $|S_1\rangle$ or $|S_2\rangle$. However, the first two gratings redirect the two signal states $|S_3\rangle$ and $|S_4\rangle$ into $|R_4\rangle$ and $|R_3\rangle$ respectively, in accordance with the Pauli X-gate, $$\hat{X} = \begin{pmatrix} 0 & 1 \\ 1 & 0 \end{pmatrix}. \tag{40}$$

The first hologram is equivalent to the operator, $$U_1 = |S_1\rangle \langle S_1| + |S_2\rangle \langle S_2| + |R_4\rangle \langle S_3| + |S_4\rangle \langle S_4|, \tag{41}$$

and the second hologram recorded with signal plane wave, $\langle \vec{r}|S_3\rangle$ and reference plane wave, $\langle \vec{r}|R_4\rangle$, is equivalent to the operator, $$U_2 = |S_1\rangle \langle S_1| + |S_2\rangle \langle S_2| + |R_4\rangle \langle R_4| + |R_3\rangle \langle S_4|. \tag{42}$$

After the signal state, $|IN\rangle$, passes through the first hologram the basis vectors change from $\{S_1, S_2, S_3, S_4\}$ to the orthonormal basis, $\{S_1, S_2, R_4, S_4\}$. This explains why the third term in Eq. 42 is entirely within the reference space.

While these two recordings could have been made in a single multiplexed hologram, we recover the same function by stacking the two together, thereby generating the CNOT operation, $$U_{CNOT} = U_2 U_1 = |S_1\rangle \langle S_1| + |S_2\rangle \langle S_2| + |R_3\rangle \langle S_4| + |R_4\rangle \langle S_3|. \tag{43}$$

However, the output of these two stacked holograms are the reference states, $|R_1\rangle, |R_2\rangle, |R_3\rangle$, and $|R_4\rangle$. In order to redirect these back to the proper signal states, we require the redirection operator similar to Eq. 6. This can be accomplished by recording a third hologram with the states $|R_3\rangle$ and $|S_3\rangle$. The third hologram is equivalent to the operator, $$U_3 = |S_1\rangle \langle S_1| + |S_2\rangle \langle S_2| + |S_3\rangle \langle R_3| + |R_4\rangle \langle R_4|. \tag{44}$$

Similarly, the fourth hologram is recorded with the states $|R_4\rangle$ and $|S_4\rangle$ and the fourth hologram is equivalent to operator, $$U_4 = |S_1\rangle \langle S_1| + |S_2\rangle \langle S_2| + |S_3\rangle \langle S_3| + |S_4\rangle \langle R_4|. \tag{45}$$

Therefore, the combination of the four stacked volume holograms has the desired action—the CNOT gate.

$$\widetilde{CNOT} = U_4 \cdot U_3 \cdot U_2 \cdot U_1 = |S_1\rangle \langle S_1| + |S_2\rangle \langle S_2| + |S_3\rangle \langle S_4|. \tag{46}$$

One can apply these principles to design a universal set of quantum gates, as well as simple quantum algorithms such as QT.

The advantage of stacking the holograms is that one can make the hologram thicker, thereby increasing the efficiency. However, achieving and maintaining the proper alignment can be more problematic. By multiplexing, one would need two holograms, each with two independent recordings in them. The first would be equivalent to the last two holograms in FIG. 7, while the second would be equivalent to the first two and would just redirect the reference beams into their corresponding signal states. The first two recordings are complementary to the second two—thus in some sense record the "square root" of the CNOT gate.

Figure 8:
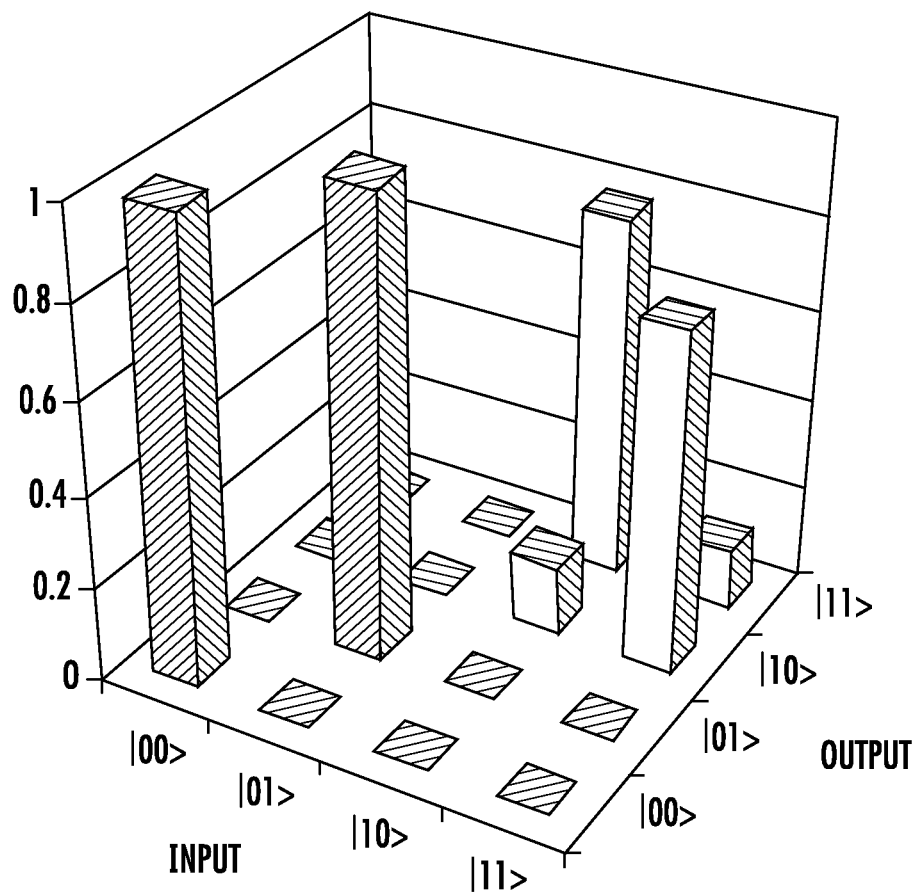
FIG. 8 is a bar chart showing the results of testing a CNOT gate in accordance with the various embodiments.

Based on the foregoing, a CNOT gate was fabricated using PTR glass, as described above, and tested for input states $|00\rangle, |01\rangle, |10\rangle$, and $|11\rangle$ to see if proper correspondence to output states $|00\rangle, |01\rangle, |10\rangle$, and $|11\rangle$ was observed. The results are shown in FIG. 8 and Table 1 below.

TABLE 1

CNOT gate test results

| input | output |||| 
|---|---|---|---|---|
| | $|00\rangle$ | $|01\rangle$ | $|10\rangle$ | $|11\rangle$ |
| $|00\rangle$ | 0.99 | 0 | 0 | 0 |
| $|01\rangle$ | 0 | 0.99 | 0 | 0 |
| $|10\rangle$ | 0 | 0 | 0.15 | 0.73 |
| $|11\rangle$ | 0 | 0 | 0.78 | 0.12 |

The results of FIG. 8 and Table 1 reflect the relative intensity of the diffracted light passing through the fabricated CNOT gate. As shown in FIG. 8 and Table 1, good correspondence between the output data and Eq. 37 is observed. More importantly these results are comparable to other attempts to produce a CNOT gate using conventional optical bench elements. For example, the results above are comparable to those observed by Pittman et al., Phys Rev. A, 68, 032316 (2003) and Gasparoni et al., Phys. Rev. Let., 93(2), 020504 (2004). Therefore, the foregoing results clearly show that the compact holographic quantum gates in accordance with the various embodiments provide a substantially similar functionality as the larger and more complex optical bench counterparts.

Figure 9:
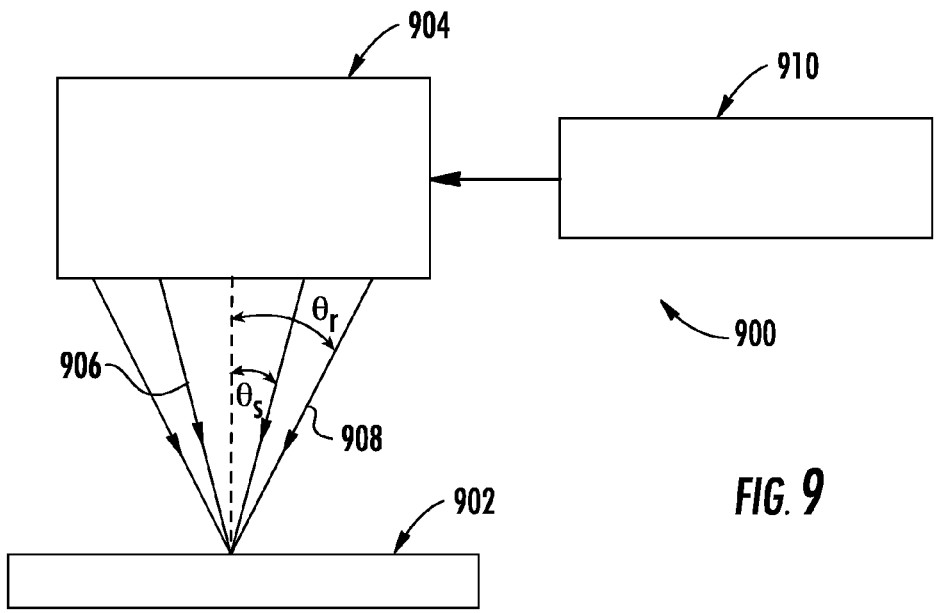
FIG. 9 is a block diagram of an exemplary system for encoding a volume holographic element in accordance with the various embodiments.

The encoding of quantum algorithms described above can be implemented in several ways. For example, one exemplary system for encoding is illustrated with respect to FIG. 9. FIG. 9 is a block diagram of an exemplary system 900 for encoding a volume holographic element 902 in accordance with the various embodiments of the invention. The system 900 essentially consists of a series of optic components 904 for generating and directing the signal plane waves 906 and the reference plane waves 908 into holographic element 902, as previously described. In some configurations, the operation of components 904 can be controlled via a controller 910. For example, the controller 910 can control the operation or position of any light sources, beam splitters, mirrors, shutters, lenses, or any other elements needed for properly directing the plane waves 906 and 908 into holographic element 902 for recording the quantum algorithm in a row-by-row manner, as previously described. In some configurations, the controller 910 can also include a user terminal for a user to engage with and generate the unitary matrix operator based on user input.

In the various embodiments, the series of optical components 904 can be arranged in a variety of ways to provide the plane waves 906 and 908. One exemplary configuration for a portion of the series of optical components 904 configured for generating signal plane waves 906 is illustrated in FIG. 10.

Figure 10:
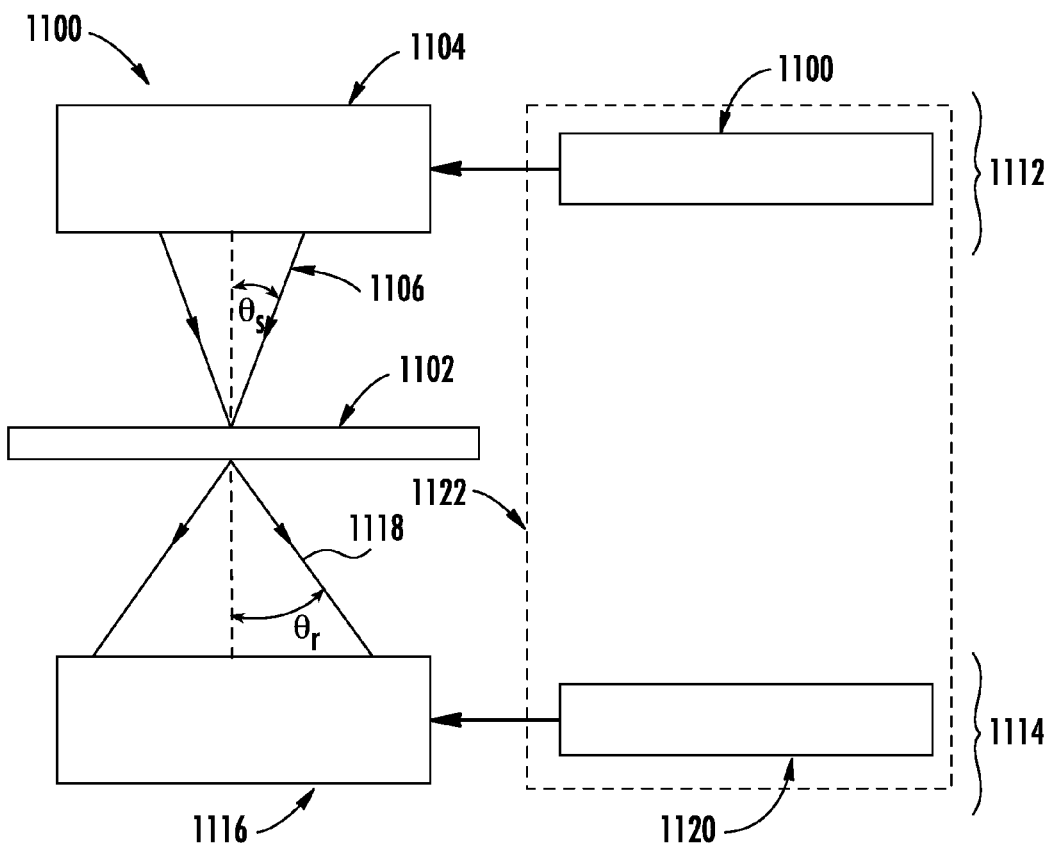
FIG. 10 is an exemplary configuration for generating plane waves in accordance with the various embodiments.

The portion of 904 shown in FIG. 10 shows that the plane waves can be generated from a single light source LS. However, the various embodiments are not limited in this regard and multiple light sources can be utilized. Referring back to the configuration of FIG. 10, a beam of light from light source LS is directed into a beamsplitter BS2, which splits the beam into a first portion, directed into beamsplitter BS2, and a second portion, directed into beamsplitter BS3. Beamsplitter BS1 produces a first beam 906A, which is directed to holographic element 902, and a second beam 906B, which is directed to holographic element 902 via mirror M2. Beamsplitter BS3, in turn, produces a third beam 906C, which is directed to holographic element 902 via mirror M3, and a fourth beam 906D, which is directed to holographic element 902 via mirrors M4 and M5. The configuration in FIG. 10 is arranged so that beams 906A-D are each disposed along the same conical surface and are substantially evenly spaced apart (i.e., separated by n/2). The term "substantially", as used herein with respect to a value or relationship, refers to being within 20% of the stated value. However, as noted above, uniform placement of these signals around the cone should yield maximal relative angles and hence highest efficiency. A similar set of components can then be provided to generate the reference plane waves. Alternatively, additional components can be added to the configuration of FIG. 10 to produce the reference waves.

As shown in FIG. 10, some or all of the components can be adjustable or controllable. In some embodiments, these components can be configured automatically. However, as discussed above, these components can also be controlled automated means, such as by a computer or the like.

The configuration of FIG. 10 is but one possible arrangement for generating plane waves in accordance with the various embodiments. However, the various embodiments are not limited solely to this configuration and the present disclose contemplates that the plane waves needed for the various embodiments can be generated in a variety of other ways not described herein. Further, the present disclosure also contemplates that such configurations can include more or less elements than those illustrated in FIG. 10.

Figure 11:
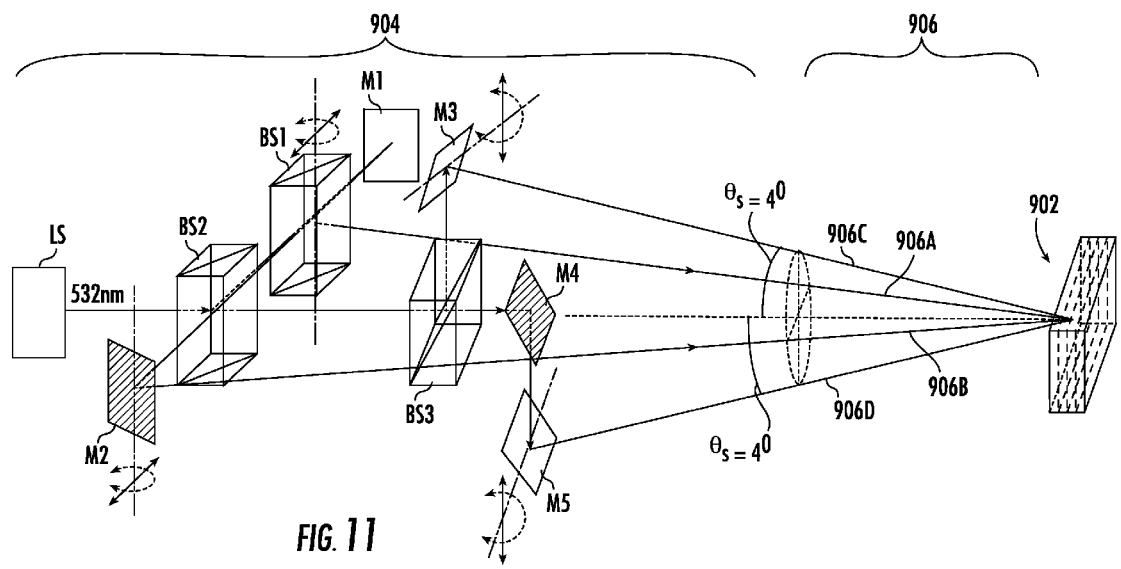
FIG. 11 is a block diagram of an exemplary system for QIP using a volume holographic element in accordance with the various embodiments of the invention.

A similar arrangement can be implemented for performing QIP using the holographic element after encoding of the quantum algorithm. One exemplary configuration is illustrated in FIG. 11. FIG. 11 is a block diagram of an exemplary system 1100 for using a volume holographic element 1102 in accordance with the various embodiments of the invention. The system 1100 consists of a series of optic components 1104 for generating and directing the signal plane waves 1106 into holographic element 1102, as previously described. For example, components 1104 can be an arrangement of components similar to that illustrated in FIG. 10. In some configurations, the operation of components 1104 can be controlled via an input controller 1110. For example, the input controller 1110 can controller the operation and position of any light sources, beam splitters, mirrors, shutters, lenses, or any other elements needed for properly directing the plane waves 1106 into holographic element 1102. In some configurations, the input controller 1110 can also include a user terminal for a user to engage with and generate the instructions for using the system 1100. Together, the controller input 1100 and the components 1104 define an input stage 1112.

In addition to the foregoing components, system 1100 can include an output stage 1114 for detecting and processing the output of the holographic element 1102. In particular, a detector 1116 can be provided. The detector 1116 can be one or more optical components configured to detect the presence of or intensity of the reference beams 1118 generated by the holographic element 1102 in response the signal beam 1106 directed therein. The detector 1116 can be configured to generate and output signal than can then be directed to an output device or controller 1120. The output controller 1120 can then be used, with the unitary matrix operator, to interpret the signals generated by the system 1100. In some configurations, the input controller 1110 and output controller 1120 may form a single controller 1122 for system 1100.

The configuration of FIG. 11 is but one possible arrangement in accordance with the various embodiments. However, the various embodiments are not limited solely to this configuration and the present disclose contemplates that the plane waves needed for the various embodiments can be generated and detected in a variety of other ways not described herein. Further, the present disclosure also contemplates that such configurations can include more or less elements than those illustrated in FIG. 11.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above-described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method of encoding a quantum algorithm in an optical device, comprising:
    receiving an n by n unitary matrix operator representing the quantum algorithm, each row of the unitary matrix operator defining a superposition of n basis state vectors for transforming an input state into an output state;
    recording each row of the unitary matrix operator by applying, to a volume holographic element having first and second opposing and substantially parallel faces, a combination of an $i^{th}$ one of n reference waves and a superposition of n signal waves defined by the superposition defined in an $i^{th}$ row of the unitary matrix operator,
    wherein the n signal waves comprise a first set of n plane waves lying on a first conical surface having a first half angle and that extends from a selected point on a first face of the volume holographic element, wherein the n reference waves comprise a second set of n plane waves lying on a second conical surface with a second half angle different than the first half angle and that extends from the selected point, and wherein the first conical surface and the second conical surfaces are concentric.

2. The method of claim 1, wherein an axis of the first conical surface is normal to the first face of the volume holographic element.

3. The method of claim 1, wherein n signal waves are evenly spaced on the first conical surface, and wherein the n reference waves are evenly spaced on the second conical surface.

4. The method of claim 3, wherein azimuthal angles for the n signal waves and the n reference waves are substantially the same.

5. The method of claim 1, wherein the second half angle is greater than the first half angle.

6. The method of claim 1, wherein the recording further comprises applying the combination for each of the rows of the unitary matrix operator to a different volume holographic element to define n volume holographic elements, and wherein the method further comprises stacking the n volume holographic elements to define the optical device.

7. The method of claim 1, wherein the recording further comprises applying the combination for each of the rows of the unitary matrix operator to a same volume holographic element.

8. The method of claim 1, wherein the volume holographic element is a photo-thermal refractive glass element.

9. A system of encoding a quantum algorithm in an optical device, comprising:
  a controller for receiving an n by n unitary matrix operator representing the quantum algorithm, each row of the unitary matrix operator defining a superposition of n basis state vectors for transforming an input state into an output state;
  a recording stage operatively coupled to the controller for recording each row of the unitary matrix operator,
  wherein the controller causes the recording stage to selectively apply, to a volume holographic element having first and second opposing and substantially parallel faces, a combination of an $i^{th}$ one of n reference waves and a superposition of n signal waves defined by the superposition defined in an $i^{th}$ row of the unitary matrix operator,
  wherein the recording stage comprises optical components for generating the superposition of the n signal waves by directing a combination of plane waves selected from a first set of n plane waves lying on a first conical surface having a first half angle and that extends from a selected point on a first face of the volume holographic element and for generating the $i^{th}$ one of the n reference waves by directing a plane wave selected from a second set of n plane waves lying on a second conical surface concentric with the first conical surface and having a second half angle different than the first half angle and extending from the selected point.

10. The system of claim 9, wherein an axis of the first conical surface is normal to the first face of the volume holographic element.

11. The system of claim 9, wherein n signal waves are evenly spaced on the first conical surface, and the n reference waves are evenly spaced on the second conical surface.

12. The system of claim 11, wherein azimuthal angles for the n signal waves and the n reference waves are substantially the same.

13. The system of claim 9, wherein the second half angle is greater than the first half angle.

14. A system for executing an n-dimensional quantum algorithm using an optical device, comprising:
  at least one volume holographic element having first and second opposing and substantially parallel faces and that, responsive to receiving at least one of n pre-defined superpositions of n pre-defined signal plane waves lying on a first conical surface having a first half angle, produces an output comprising at least one of n pre-defined reference plane waves lying on a second conical surface with a second half angle different than the first half angle, wherein each of the n pre-defined reference plane waves uniquely corresponds to each of the n pre-defined superpositions;
  an input stage optically coupled to the first face of the at least one volume holographic element and for generating at least one incident plane wave comprising at least one of the n-predefined superpositions; and
  a detector stage optically coupled to the second face of the at least one volume holographic element and for detecting an output intensity for the n pre-define reference waves responsive to the at least one incident plane wave.

15. The system of claim 14, further comprising a controller for interpreting the output according to n by n unitary matrix operator representing the quantum algorithm, each row of the unitary matrix operator defining a superposition of n basis state vectors for transforming an input state into an output state.

16. The system of claim 14, wherein the at least one volume holographic element comprises a plurality of volume holographic elements in a stacked arrangement, wherein each of the plurality of volume holographic elements produces a different one of the n reference plane waves.

17. The system of claim 14, wherein n pre-defined signal plane waves are evenly spaced on the first conical surface, and the n pre-defined reference plane waves are evenly spaced on the second conical surface.

18. The system of claim 17, wherein azimuthal angles for the n pre-defined signal plane waves and the n pre-defined reference plane waves are substantially the same.

19. The system of claim 14, wherein the second half angle is greater than the first half angle.

20. The system of claim 14, wherein the volume holographic element is a photo-thermal refractive glass element.

* * * * *